(12) United States Patent
Viaud

(10) Patent No.: US 8,230,663 B2
(45) Date of Patent: Jul. 31, 2012

(54) BALER AND WRAPPER COMBINATION

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 426 days.

(21) Appl. No.: 12/512,197

(22) Filed: Jul. 30, 2009

(65) Prior Publication Data

US 2010/0024357 A1 Feb. 4, 2010

(30) Foreign Application Priority Data

Jul. 31, 2008 (EP) .................................. 08161549

(51) Int. Cl.
*B65B 63/04* (2006.01)
(52) U.S. Cl. .................... 53/116; 53/118; 53/176
(58) Field of Classification Search .............. 53/116, 53/118, 389, 176, 211, 215, 589, 587, 389.4
See application file for complete search history.

(56) References Cited

U.S. PATENT DOCUMENTS

| | | | | |
|---|---|---|---|---|
| 4,282,700 A | * | 8/1981 | Goldstein | 53/556 |
| 4,343,132 A | * | 8/1982 | Lawless, Jr. | 53/399 |
| 4,409,784 A | * | 10/1983 | VanGinhoven et al. | 56/341 |
| 4,499,714 A | * | 2/1985 | Hollmann | 56/341 |
| 4,685,270 A | | 8/1987 | Brambilla | |
| 5,802,805 A | * | 9/1998 | Øiestad | 53/176 |
| 5,822,967 A | * | 10/1998 | Hood et al. | 56/341 |
| 6,463,714 B2 | * | 10/2002 | Viaud | 53/118 |
| 2008/0264031 A1 | * | 10/2008 | McHale et al. | 56/341 |
| 2010/0077716 A1 | * | 4/2010 | Sonne | 56/341 |

FOREIGN PATENT DOCUMENTS

| | | |
|---|---|---|
| DE | 4138499 | 5/1993 |
| DE | 4120733 | 7/1993 |
| EP | 0367529 | 10/1989 |
| EP | 0829197 | 8/1997 |
| EP | 0865723 | 3/1998 |
| EP | 0910941 | 9/1998 |
| EP | 1186225 | 8/2001 |
| EP | 1438889 | 11/2003 |
| FR | 2658985 | 3/1990 |
| GB | 2159489 | 5/1985 |
| GB | 2305648 | 9/1996 |
| IT | 1225741 | 8/1988 |
| WO | 96/12399 | 5/1996 |
| WO | 99/64297 | 12/1999 |

* cited by examiner

*Primary Examiner* — Sameh H. Tawfik

(57) ABSTRACT

A baler and wrapper combination comprises a baler, a bale wrapper, and a bale transport table. The bale transport table is movable between a bale receiving position at a bale output location of the baler, a wrapping position at which the wrapper can wrap a bale located upon the bale transport table with a sheet material, while movable bale support elements rotate the bale around its horizontal central axis, and a bale depositing position in which a wrapped bale can be deposited on the ground. The bale support elements are arranged to be moved in the bale depositing position into an orientation in which the bale is deposited on its flat end.

16 Claims, 10 Drawing Sheets

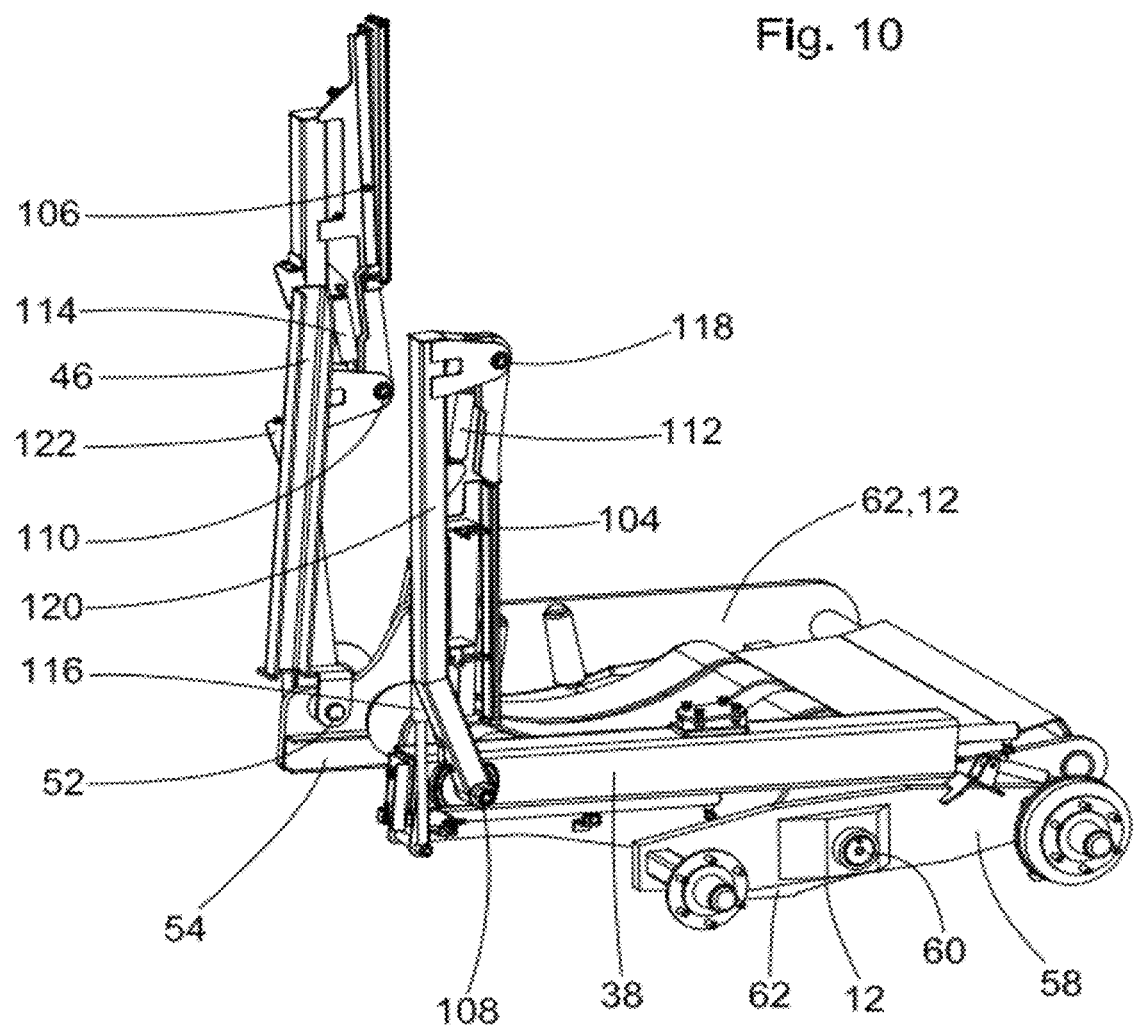

BALER AND WRAPPER COMBINATION

FIELD OF THE INVENTION

The present invention relates to a baler and wrapper combination. The baler and wrapper combination has a baler, a bale wrapper, and a bale transport table. The bale transport table has movable bale support elements arranged to rotate the bale around its horizontal central axis. The bale transport table is movable between a bale receiving position at a bale output location of the baler, a wrapping position at which the wrapper can wrap a bale located upon the bale transport table with a sheet material, and a bale depositing position in which a wrapped bale can be deposited in the field.

BACKGROUND OF THE INVENTION

Bale wrappers are commonly used in agriculture to wrap bales with films consisting of impervious material such as plastics to envelop the baled material in an airtight manner for the process of ensilage of fodder.

In certain embodiments, such wrappers are realized as independent machines connected to a tractor for transporting either the wrapper to the respective bales lying in the field or for transporting the bales to the wrapper (EP 0 829 197 A, GB 2 159 489 A, GB 2 305 648 A, IT 1 225 741 B, EP 0 367 529 A, WO 99/64297 A). In these wrappers, the plastic material is wrapped by rotating the bale around its horizontal axis, while either a table supporting the bale (GB 2 159 489 A, IT 1 225 741 B, EP 0 367 529 A) or an arm carrying the wrapping material (EP 0 829 197 A) is rotated simultaneously around a vertical axis, or all three rotations are commonly performed (WO 99/64297 A). The bale is released to the ground after completion of the wrapping process by tilting the table or the parts of the wrapper holding the table. The bale thus rolls down from the table to the ground. If it is intended to deposit the bale on its flat end, an auxiliary tipping device can be used behind the wrapper (GB 2 305 648 A, EP 0 910 941 A). One disadvantage of the separate wrappers is that a tractor and an operator are required for a second operation in the field after baling, and that a considerable amount of time can pass before the bale is wrapped, such that the crop may wilt or spoil in the meantime.

In other embodiments, the wrapper is mounted on a common frame with a baler (DE 41 20 733 A, EP 0 865 723 A, EP 1 186 225 A, EP 1 438 889 A) or mounted on a separate wheeled chassis that is pulled behind the baler (FR 2 658 985 A, WO 96/12399 A, U.S. Pat. No. 4,685,270 A), such that baling and wrapping can be performed in a single pass over a field and the bale is wrapped immediately after baling.

In the baler/wrapper combinations with a single frame, a table is typically provided that slides along the frame to receive the completed bale from the baler and to move it rearwards to the wrapper (DE 41 20 733 A, EP 0 865 723 A, EP 1 186 225 A, EP 1 438 889 A), or a tiltable device catches the bale from the baler and conveys it to the wrapping table (DE 41 38 499 A). The table comprises rolls or belts for rotating the bale around its axis during wrapping, while an arm carrying the wrapping material is rotated simultaneously around a vertical axis. The bale is discharged by tilting the table to the rear, such that the bale rolls down to the ground. If the bale is to be deposited on its end, a tilting device can be used behind the table for tipping the bale over (DE 41 38 499 A).

The wrappers that are pulled behind the baler are mounted on a separate chassis with two wheels that are connected to the frame of the wheeled baler by an extendable bar, which is mounted pivotally around a vertical axis to the baler frame (FR 2 658 985 A, WO 96/12399 A, U.S. Pat. No. 4,685,270 A), or by two extendable bars on both sides, while the wrapper wheels are free to rotate around a vertical axis (FR 2 658 985 A). In the contracted position of the extendable bar, a picking device of the wrapper is positioned immediately behind the outlet of the baler to receive the bale. Then the bar is extended, the bale is transported from the picking device to the wrapping table, and the bale is wrapped, by rotating the bale around its axis and an arm dispensing the wrapping material around a vertical axis, or by rotating the bale around its axis and a vertical axis (FR 2 658 985 A). Finally, the bale is deposited on the ground in the manner described with respect to the baler/wrapper combinations with a single frame.

EP 1 832 157 A proposes a baler, wrapper or baler/wrapper combination with a bale depositing device behind the baler or wrapper that can put the bale on its flat end dependent on the slope of the field.

One disadvantage of the wrapper pulled behind the baler is that the entire combination is relatively long and thus difficult to operate in a field, especially during turning in the headland and in particular when heading backwards. Another problem, both with the known wrappers pulled behind the baler and the baler/wrapper combinations having a single frame, is that if the bale is to be deposited on its flat end, additional tilting devices need to be employed for tipping the bale over during unloading, adding complexity and cost to the machine.

SUMMARY OF THE INVENTION

It is thus an object of the present invention to provide a baler/wrapper combination that overcomes the shortcomings of the prior art.

Accordingly, a baler and wrapper combination is arranged to be pulled behind a tractor over a field and comprises baler and a wrapper, as well as a bale transport table. The bale transport table is movable in the fore-aft direction of the combination, between a bale receiving position in which it can receive a completed bale that is ejected by the baler, and a wrapping position in which the wrapper can wind sheet material around the bale, while the latter is rotated around its central horizontal axis by movable bale support elements of the bale transport table. Further, the bale support table is movable into a bale depositing position in which the wrapped bale is deposited onto the ground. The bale support elements are arranged to be moved, in the bale depositing position, into an orientation in which the bale is deposited on its flat end. Preferably, they can also be moved into an orientation in which the bale is deposited on its circumference. The former position has the advantage that the bale cannot roll away, especially on sloped fields.

The baler and wrapper combination preferably comprises a frame that is supported on wheels or belted crawler chains. The frame is preferably a single frame, which can comprise distinct parts assigned to the baler and to the wrapper, respectively, but are rigidly mounted together, or unitary parts supporting both the baler and the wrapper. The baler and the wrapper are mounted to the frame. In another embodiment, the baler has a frame supported on assigned wheels and the wrapper has a frame supported on assigned wheels. The frames can be pivotally coupled around a vertical axis or be rigidly connected.

The bale orientation can be selected among the mentioned orientations, in an advantageous embodiment automatically according to the slope of the field in the fore-aft and transverse direction, such that the bale is deposited on its flat end unless the field is sufficiently flat such that the bale cannot roll away. In another embodiment, or a manual mode of the automatic embodiment, the operator can select whether the bale is deposited on its end or on its circumference. For this purpose, an electronic control unit can be provided on board of the baler and wrapper combination or of the tractor. The control unit is connected to the actuators of the baler and wrapper combination for controlling the bale handling process and to an operator interface with which the operator can select a desired operating and bale depositing mode.

The first mentioned orientation and also the latter one can be achieved when the bale support elements are arranged to be rotationally driven around a vertical axis. Such a rotational mounting of the bale support elements allows selecting the orientation of the bale transport table and thus the bale in the bale depositing position before and/or during unloading between a position in which the bale is deposited on its circumference, and by turning the bale transport table by up to 90° around the vertical axis, another position in which the bale is deposited on its flat end.

The bale transport table preferably pivots around a horizontal axis into the bale depositing position. This horizontal axis can be oriented transversely to the fore-aft direction of the baler, such that the bale is ejected to the rear, or parallel to the fore-aft direction of the baler, such that the bale is ejected to the side, or between these two mentioned orientations, for example by 45° to the rear and to the side, such that the bale is ejected under an angle of 45° with respect to the fore-aft direction towards the side. The embodiment with selectable angles of the pivot axis of the bale transport table does not require a bale transport table that can be rotated around the vertical axis. Such an arrangement can comprise three ball joint bearings for supporting the bale transport table on its three corners, wherein two of the bearings are supported on corresponding arms or actuators, which may be tilted or shifted on their end.

The bale transport table is preferably mounted to the frame by means of an extendable arm that extends and retracts in the fore-aft direction of the baler and wrapper combination. Such an arm can comprise two U-shaped bars or the like that are mounted together in a sliding fashion or a telescoping element. An actuator moves the bale transport table in the fore-aft direction. In order to avoid synchronizing problems, preferably only a single extendable arm is provided.

The extendable arm can be located at the longitudinal center plane of the frame or at a side thereof. Especially in the latter case, the bale support table can be additionally supported on a bale transport table support element that extends in the fore-aft direction and is offset towards the side from the extendable arm, preferably such that the bale transport table is supported between the bale transport table support element and the extendable arm.

Between the bale transport table support element and the bale transport table, at least one wheel can be provided for reducing the friction. Preferably, a single wheel is mounted to the bale transport table for this purpose, although it would be possible to mount two or more wheels to the bale transport table or to the bale transport table support element.

In order to provide a compact transport position for the baler and wrapper combination, the bale transport table support element comprises a forward part fixed to the frame and a rear part that can be pivoted into an inoperative position around a horizontal bale transport table support element pivot axis while the extendable arm is retracted and the bale transport table is hence in its forward bale receiving position and supported on the forward part of the bale transport table support element. The bale transport table support element pivot axis preferably extends horizontally and transversely to the forward direction.

In a preferred embodiment of the invention, the vertical rotation axis of the bale support elements is transversely offset from the longitudinal central plane of the baler and wrapper combination. Thus, the space between the bale and the extendable arm or other elements mounted to the frame can be enlarged, what is particularly useful when the bale is rotated by 90° around the vertical axis from its original position.

In order to avoid that the bale falls down from the bale support table during rotation thereof around the vertical axis and/or the horizontal centre axis of the bale, it is proposed that the bale transport table and/or the extendable arm and/or the bale transport table support element comprise(s) upstanding bale holding elements.

Finally, the rotation of the bale support elements around the vertical axis can be continuous during the bale wrapping operation. Thus, the at least one arm holding a roll with sheet material for wrapping the bale can be fixed to the frame or it can rotate around a vertical axis in the opposite direction compared to the bale, in order to accelerate the wrapping process. It is also possible that only the arm with the sheet material roll rotates around the vertical axis during the wrapping process in a known manner.

BRIEF DESCRIPTION OF THE DRAWINGS

Embodiments of the invention are described with reference to the accompanying drawings, wherein.

DESCRIPTION OF THE PREFERRED EMBODIMENT

Figure 1:
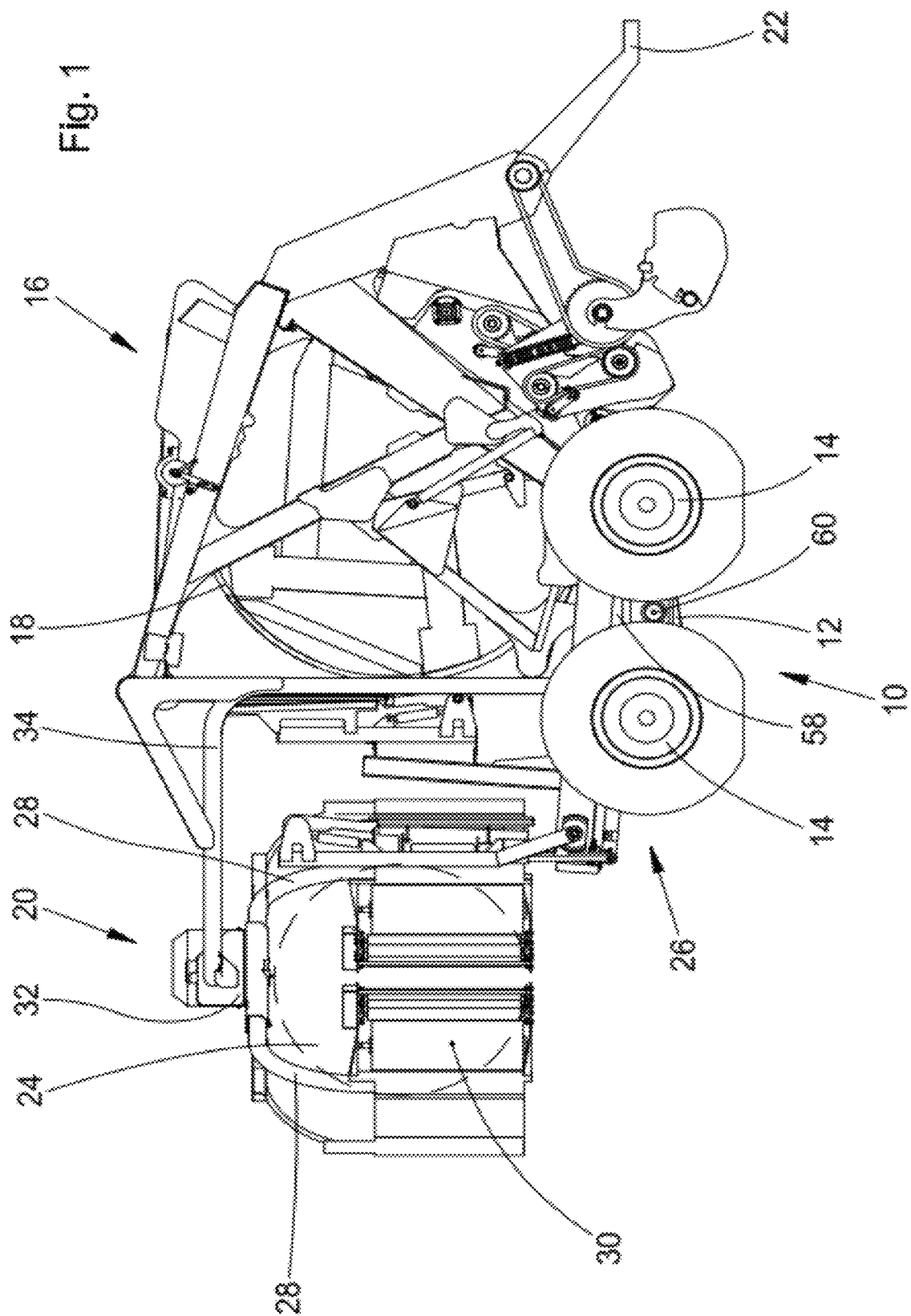
FIG. 1 is a lateral view of a baler and wrapper combination.

FIG. 1 is an elevational view of the right side of a baler and wrapper combination 10. The baler and wrapper combination 10 comprises a single frame 12 supported on tandem wheels 14. The frame 12 supports a baler 16 with a rear door 18 and a bale wrapper 20. In operation the baler and wrapper combination 10 is pulled behind a tractor (not shown) by a tongue 22 into a forward direction that extends in FIG. 1 to the right side. The baler and wrapper combination 10 could also be a self-propelled unit, manned or unmanned.

A bale 24 produced in the baler 16 is transported by a movable bale transport table 26 (not shown in FIG. 1, since in the bale receiving position below the rear door 18, but shown in the following figures) from a bale receiving position at a bale output location beneath the rear door 18 of the baler 16 to a wrapping position beneath the bale wrapper 20. Above the bale transport table 26 in the wrapping position, two opposite arms 28 having orthogonal vertical and horizontal sections surround the bale 24. Each vertical section of the arms 28 supports a film or sheet material dispenser 30. The center ends of the horizontal sections of the arms 28 are connected to a drive arrangement 32 operable to rotate the arms 30 around a vertical axis. The drive arrangement 32 is connected to the frame 12 by a support frame 34 and comprises a hydraulic motor coupled to the hydraulic system of the tractor.

Figure 2:
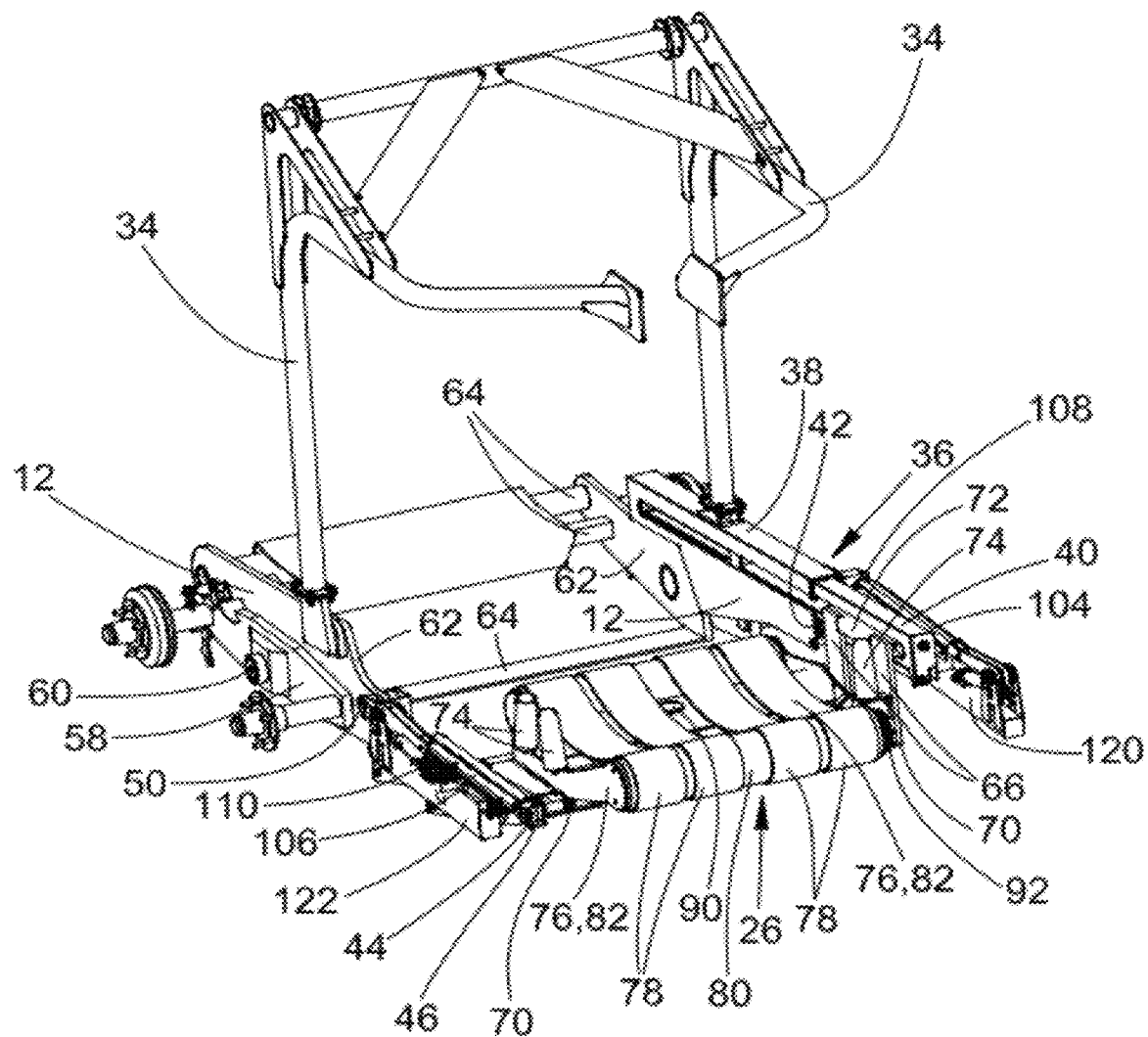
FIG. 2 is a perspective rear view of the frame of the baler and wrapper combination with the bale transport table in the wrapping position.

Reference is now made to FIG. 2, which shows the frame 12 with the support frame 34 and the bale transport table 26, while the baler 16 and the wrapper 20 are removed for the sake of clarity and simplification. The bale transport table 26 is on its right end supported on an extendable arm 36 that is composed of a forward section 38 fixed to the frame 12 and a rear, telescoping section 40 that can slide with respect to the forward section 38 in the fore-aft direction and is received within the forward section 38 in the retracted position. An actuator 42 in the form of a hydraulic cylinder is also located in the forward section 38 and serves to move the rear section 40. Actuator 42 can be mounted beneath the extendable arm 36 as shown, or mounted in a protected position within the arm 36. The left end of the bale transport table 26 is supported on a wheel 44. The wheel 44 abuts the rear part 46 of a bale transport table support element that extends in the fore-aft direction (which is the longitudinal moving direction of the bale transport table 26) and is shown in more detail in FIG. 10. The rear part 46 of the bale transport table support element is mounted to the frame 12 on its forward end pivotally around a bale transport table support element pivot axis 50 that extends transversely to the fore-aft direction and horizontal. The frame 12 further supports a forward part 54 of the bale transport table support element. The rear part 46 can thus be pivoted into an upright position for transport by an actuator 56 in the form of a hydraulic cylinder (see FIGS. 8 and 9) when the bale transport table 26 is moved into the bale receiving position, such that the wheel 46 is not supported on the rear part 46 of the bale transport table support element, but on its forward part 54, as depicted in FIG. 10.

From FIG. 2, it is further apparent that the wheels 14 are mounted to a bogie support 58 that is pivotally mounted to the frame 12 between the wheels 14 around a horizontally and transversely extending axis 60. The frame 12 comprises side members 62 connected by transverse bars 64.

Two vertically extending bars 66 supporting a lower mounting frame 70 of the bale support table 26 are mounted to the rear section 40 of the extendable arm 36 by an intermediate member 72. The wheel 44 is also mounted to the lower mounting frame 70. The forward section 38 of the extendable arm 36 is slotted to receive the intermediate member 72 when the actuator 42 is retracted. The rear bar 66 further holds a bale holding element 74. The bale holding element 74 extends vertically. It has a conical shape, and it is rotatable around the vertical axis.

Figure 3:
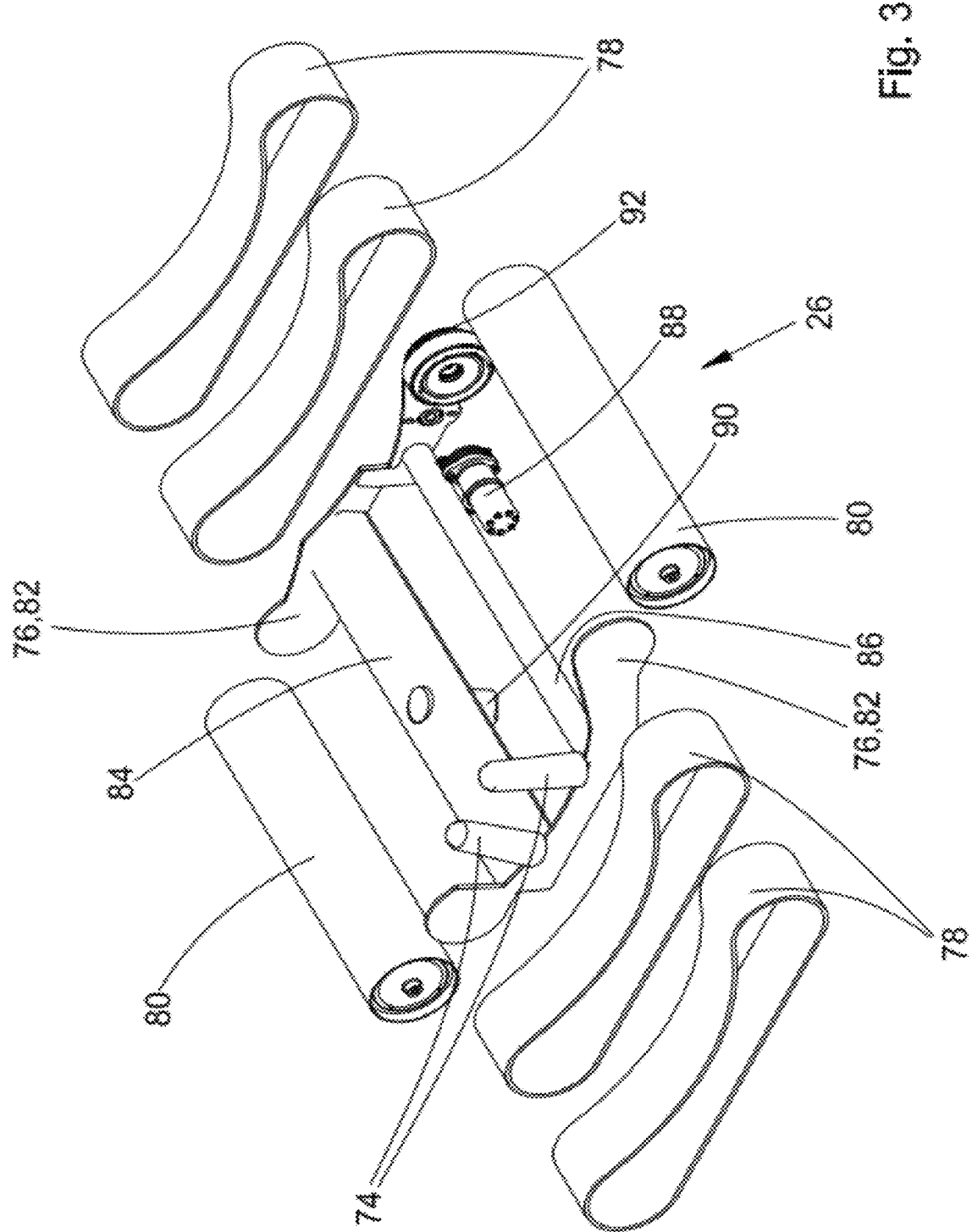
FIG. 3 is an exploded view of the bale support elements of the bale transport table.

Reference is now made to FIG. 3, showing an exploded view of an upper mounting frame 76 of the bale support table 26 and the bale support elements 78 that are provided as belts running around rollers 80. The bale support elements 78 can either have a high or a low friction. For bale unloading purposes, the bale support elements 78 can be provided with transverse ridges (not shown), that make sliding of the bale 24 transversely to the bale support elements 78 easier when the bale 24 is to be dropped with its flat end lying on the ground. The upper mounting frame 76 comprises end members 82 supporting the rollers 80. The end members 82 are connected by crossbars 84, 86. One end member 82 holds a hydraulic motor 88 that drives during operation one of the rollers 80 and thus the bale support elements 78 via a chain and sprocket transmission 92. The central crossbar 84 is supported on a vertically extending shaft 90. Two bale holding elements 74 are supported on one of the end members 82. The bale holding elements 74 extend vertically. They have a conical shape, and are rotatable around the vertical axis.

Figure 4:
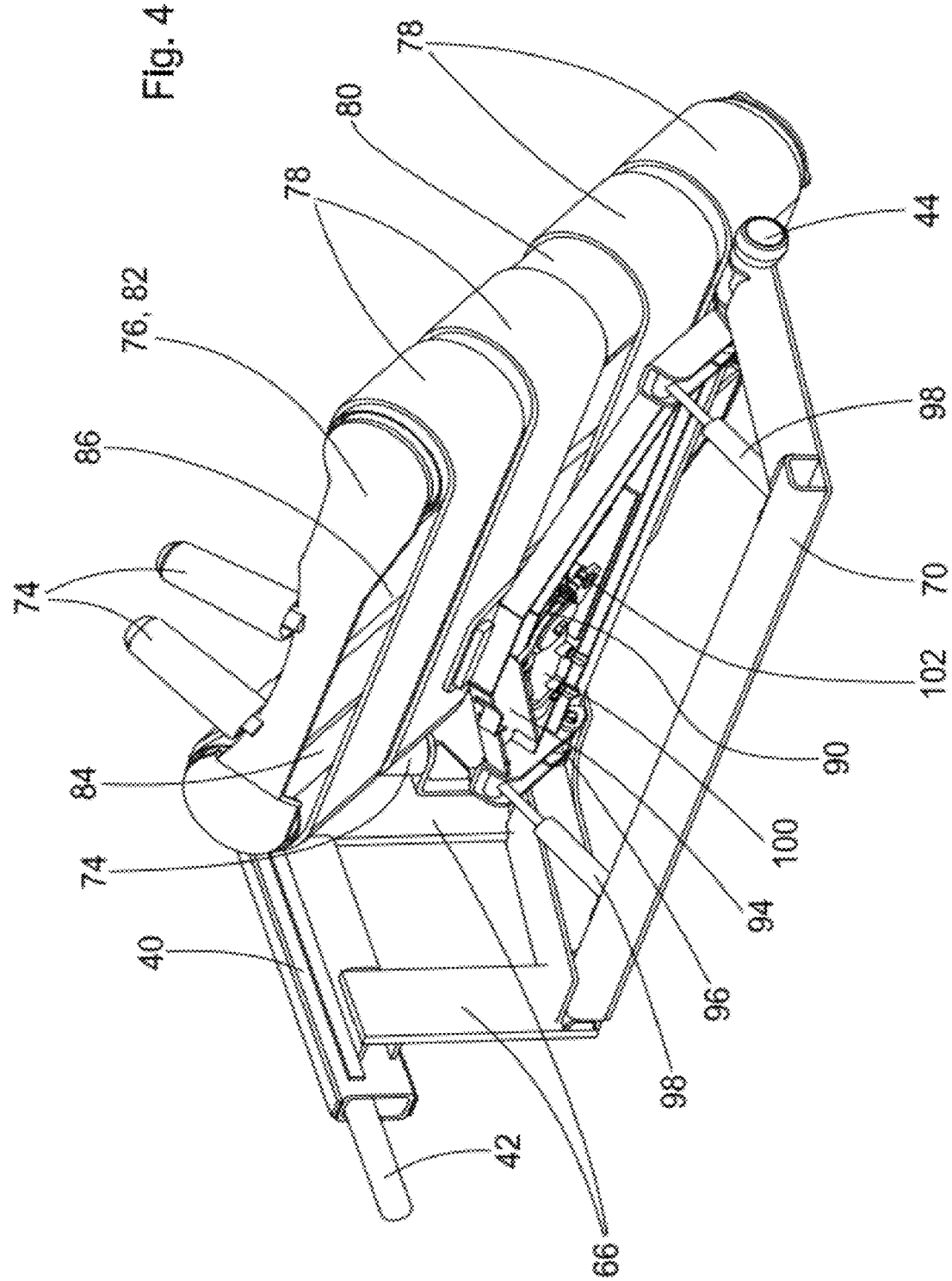
FIG. 4 is a perspective view of the bale support table in a bale depositing position.

In FIG. 4, it is shown that the lower mounting frame 70 is of a rectangular construction and holds a delta shaped pivot frame 94 pivotable around a horizontal pivot axis 96 that extends horizontal and transverse to the forward direction of the baler wrapper combination 10. The pivot frame 94 is coupled to a pair of actuators 98 in the form of hydraulic cylinders that are arranged to pivot the pivot frame 94 around the pivot axis 96. Shaft 90 of the upper mounting frame 76 is supported on the pivot frame 94 in a manner such that it can be rotated by 90° by an actuator 100 that is coupled on one end to the pivot frame 94 and on the other end to a lever 102 connected to the shaft 90. At least parts of the hydraulic supply lines leading to the hydraulic motor 88 and to the actuators 98 and 100 are flexible, since they are moving with respect to the frame 12 during operation.

Figure 5:
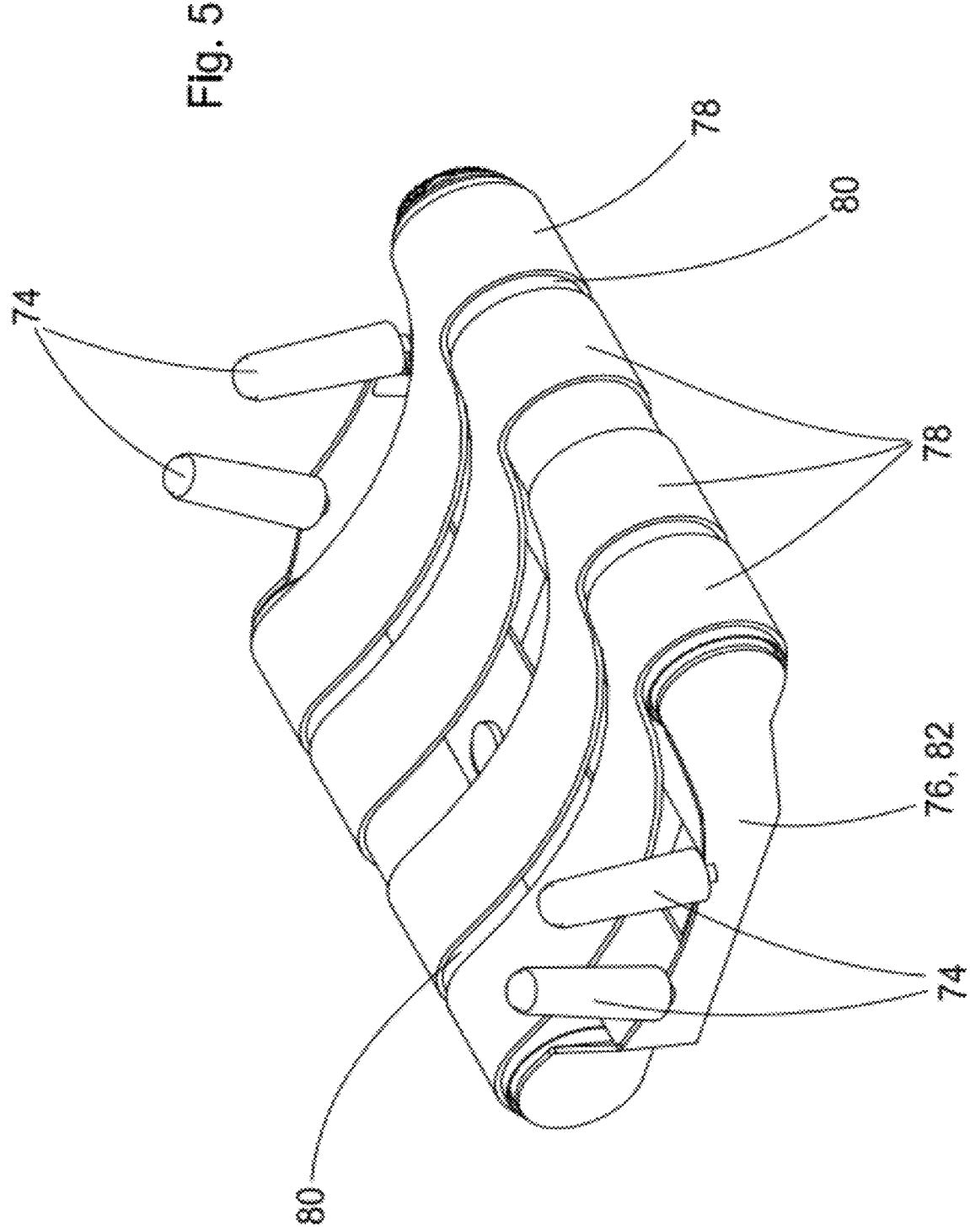
FIG. 5 is a perspective view of a second embodiment of a bale support table.

An alternative embodiment of the upper mounting frame 76 of the bale support table 26 is shown in FIG. 5. The main difference is that on both lateral end members 82, two bale holding elements 74 are provided. The added bale holding elements 74 are provided to make tipping the bale over easier during unloading.

Figure 8:
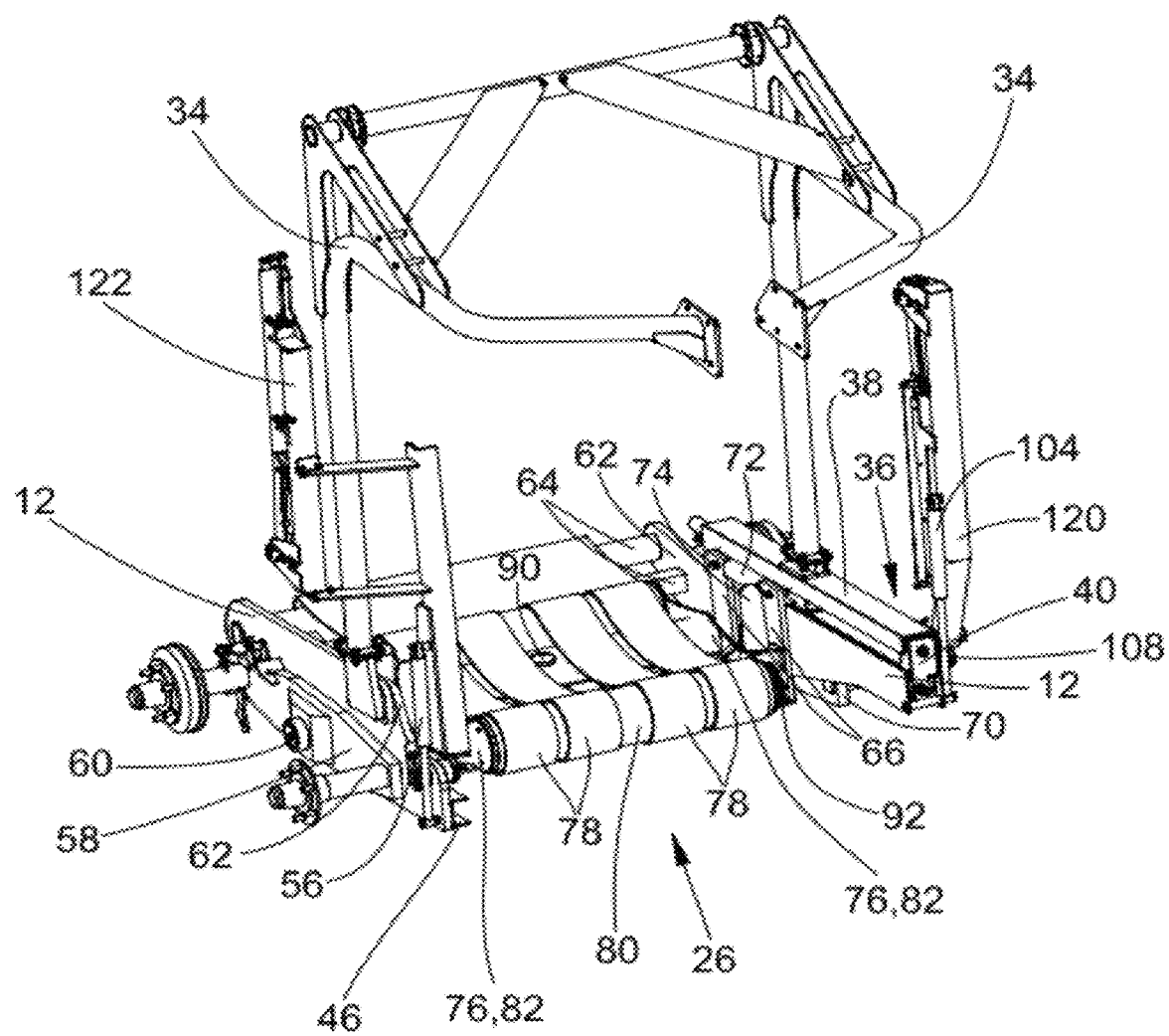
FIG. 8 is a perspective rear view of the frame of the baler and wrapper combination with the bale transport table in the bale receiving position.

Hence, the operation mode of the baler and wrapper combination 10 can be described as follows. After a bale 24 is completed by the baler 16, the actuator 42 is retracted to move the rear section 40 of the extendable arm 36 into the forward section 38 and thus the bale transport table 26 into the bale receiving position. The actuator 100 is retracted to bring the rollers 80 into a transverse position, and the actuators 98 are retracted to move the transport table 26 into a horizontal orientation. This situation is shown in FIG. 8. Then the door 18 opens and the bale 24 falls onto the bale transport table 26. If no wrapping of the bale 24 is required, the actuators 98 can be immediately extended such that the bale 24 rolls onto the ground, as shown in FIG. 9.

On the other hand, if wrapping is required, the actuator 42 is extended to telescope the rear section 40 of the extendable arm 36 out of the forward section 38, while the wheel 44 rolls first along the forward part 54 and afterwards on the rear part 46 of the bale transport table support. Thus the bale transport table 26 is brought into the bale wrapping position as depicted in FIGS. 1 and 2. During the wrapping operation, the hydraulic motor 88 drives the rollers 80, such that the bale 24 rotates around its horizontal center axis, while the arms 28 rotate around the bale 24 and the sheet material is unwound from the sheet material dispensers 30 and wrapped around the bale 24.

Film holders 104, 106 allow pulling the sheet material against the bale 24 during the start of the wrapping operation and cut it off after the wrapping process. The film holders 104, 106 are provided on both sides of the wrapper 20 and pivotally mounted around horizontal axes 118, 110 to lower film holder members 120, 122 which are mounted to the forward section 38 at the right side and to the rear part 46 of the bale transport table support at the left side of the baler and wrapper combination 10. The film holders can be pivoted by actuators 112, 114 in the form of horizontal cylinders between lowered positions for moving the bale 24 into the wrapping position as shown in FIG. 2 and raised positions for simple operation (not shown).

Figure 6:
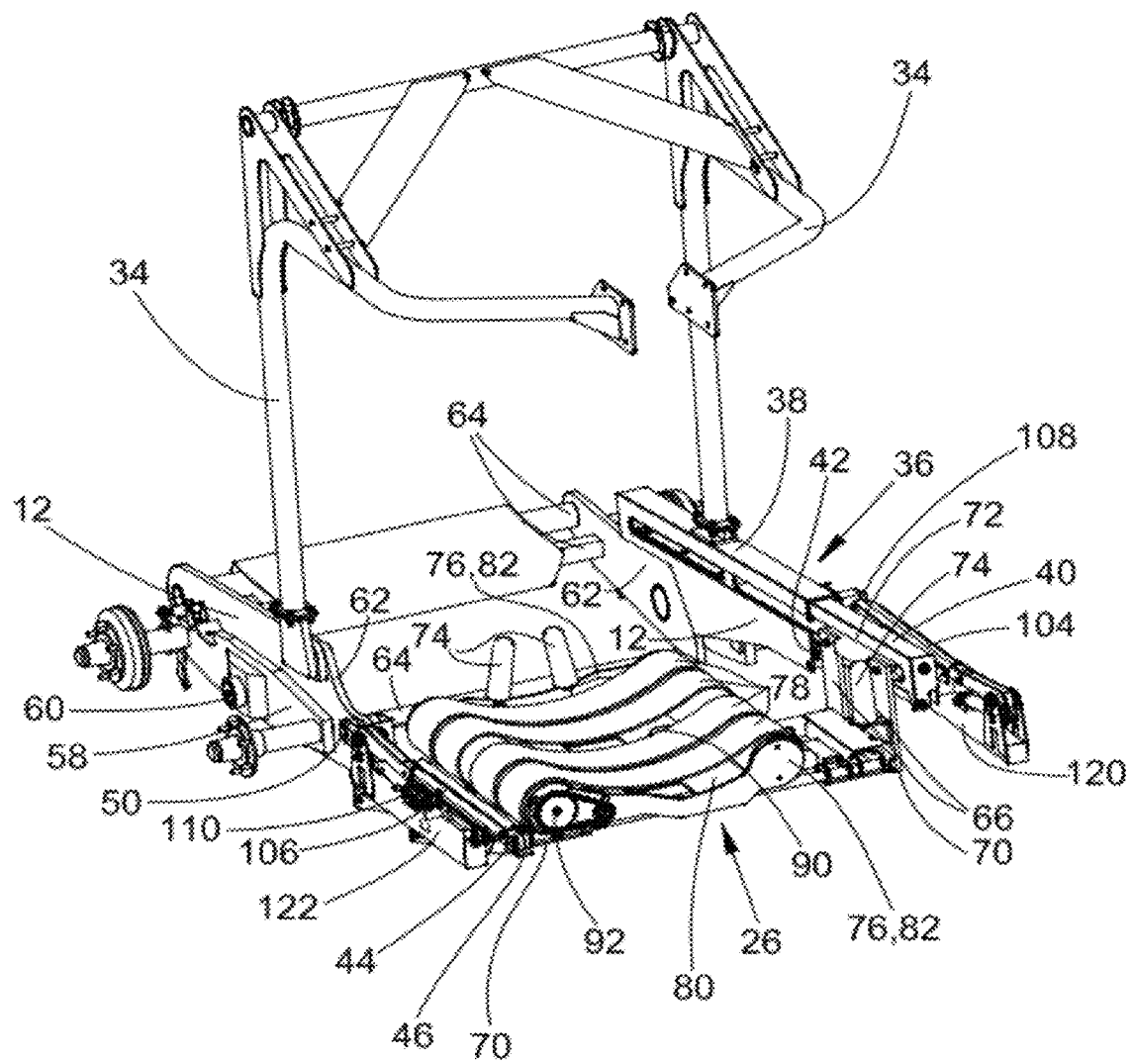
FIG. 6 is a perspective rear view of the frame of the baler and wrapper combination with the bale transport table rotated by 90° around the vertical axis relative to the orientation of FIG. 2, such that the bale would be deposited with its flat end on the ground.
Figure 7:
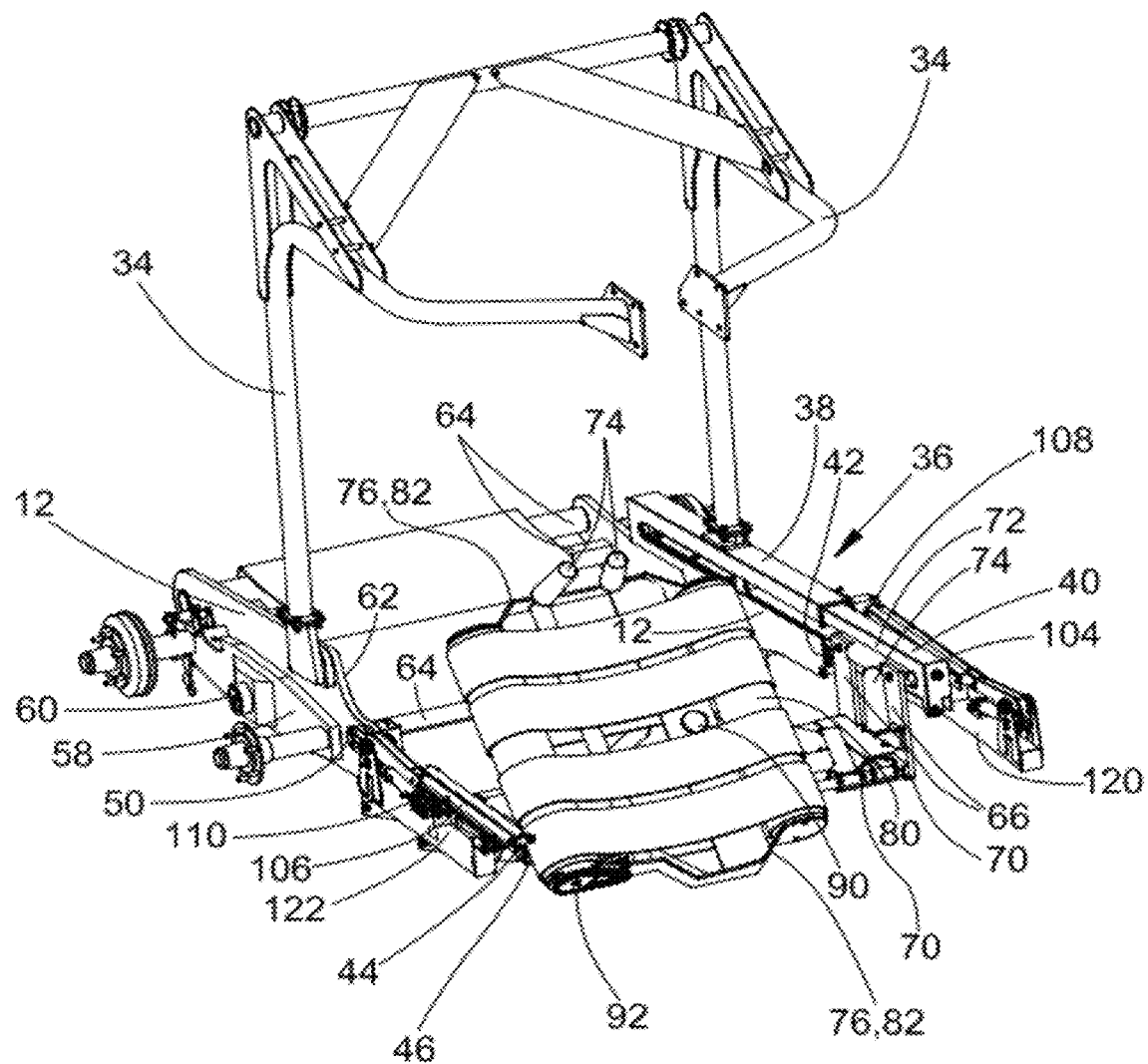
FIG. 7 is a perspective rear view of the frame of the baler and wrapper combination similar to FIG. 6, but with the bale transport table tilted in the bale depositing position as shown in FIG. 4.
Figure 9:
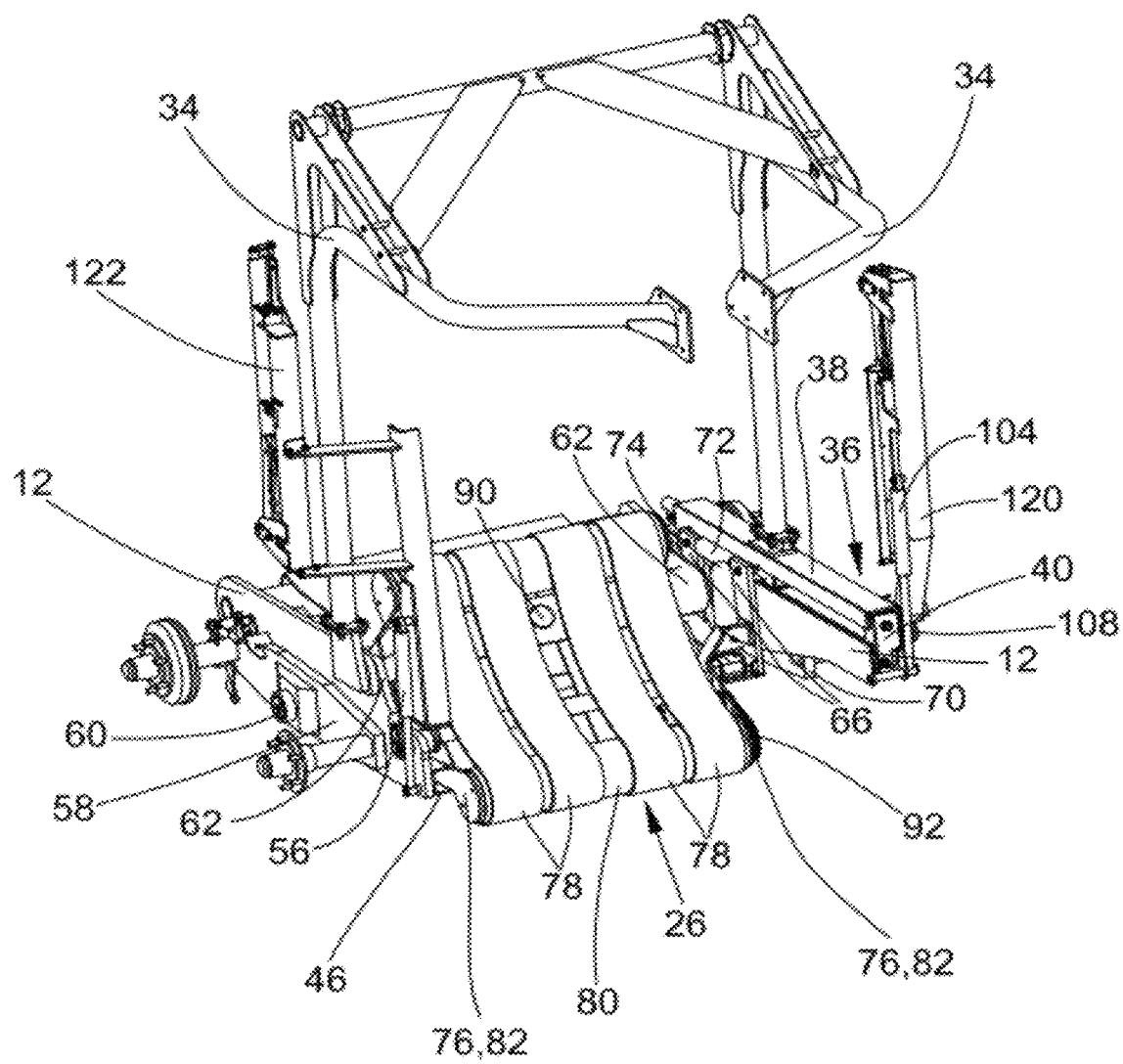
FIG. 9 is a perspective rear view of the frame of the baler and wrapper combination similar to FIG. 8, but with the bale transport table tilted in the bale depositing position; and, FIG. 10 is a perspective view of the frame with the extendable arm and the bale transport table support element in their inoperative transport position.

When the wrapping process is completed, the film on the bale 24 is cut off from the film supply on the film dispensers 30 by the film holders 104 and 106, and then the bale 24 can be unloaded by expanding actuators 98, such that the bale 24 rolls from the bale transport table 26 upon its circumference (similar to the situation shown in FIG. 9, but now the bale transport table 26 is in the wrapping position). However, if it is preferred to deposit the bale 24 with its flat end upon the ground, thus with its center axis vertical, after the wrapping operation, actuator 100 is expanded to rotate the upper mounting frame 76 together with the support elements 78 and the bale 24 around the vertical axis and thus into the position shown in FIG. 6. The shaft 90 of the upper mounting frame 76 is not located on the longitudinal center plane of the baler and wrapper combination 10, but offset to the left side by a sufficient amount to provide clearance between the bale 24 on one hand and the bale holding element 74 mounted on the vertically extending bar 66 and the rear section 40 of the extendable arm 36 on the other hand. If now the actuators 98 are expanded, as shown in FIGS. 4 and 7, the bale 24 is tipped over and rests on its flat end. Expansion (and retraction) of the actuators 100 and 98 can take place simultaneously. Thus, the bale 24 cannot roll away, what is in particular advantageous on sloped fields. In an automated embodiment, the bale 24 can be dropped onto the field only in this manner if the field slope exceeds a predetermined angle. After the bale is ejected, the process starts again as described. If the bale is not to be wrapped, but dropped on its flat end, the bale transport table can be moved from the position shown in FIG. 8 to the position of FIG. 2 and, without wrapping, to the position of FIG. 7. An electronic control unit (not shown) can be provided on board of the baler and wrapper combination 10 or on the tractor. The control unit is connected to the actuators of the baler and wrapper combination 10 for controlling the bale handling process, to a slope sensor, and to an operator interface with which the operator can select a desired operating and bale depositing mode, like described before, which is then executed automatically by the control unit.

For simple baling operation or transporting and storing the baler and wrapper combination 10, the actuator 42 is retracted to move the rear section 40 of the extendable arm 36 into the forward section 38 and thus the bale transport table 26 into a compact position. The rear part 46 of a bale transport table support element is pivoted into a vertical transport position by actuator 56 around axis 52, thus raising also the lower film holder member 122 together with film holder 106 into a vertical transport position, while the actuator 114 assigned to film holder 106 orients the latter parallel to the rear part 46. The lower film holder member 120 together with film holder 104 on the right side is also raised by an actuator 116 into a vertical transport position around an axis 108, while the actuator 112 assigned to the film holder 104 orients the latter parallel to the lower film holder member 122. Thus, a compact position is achieved, as shown in FIG. 10.

Having described the preferred embodiment, it will become apparent that various modifications can be made without departing from the scope of the invention as defined in the accompanying claims.

The invention claimed is:

1. A baler and wrapper combination, comprising:
   a baler adapted for producing round bales having a circumference and flat ends;
   a bale wrapper; and,
   a bale transport table comprising movable bale support elements arranged to rotate the bale around its horizontal central axis, the bale transport table being movable between a bale receiving position at a bale output location of the baler, a wrapping position at which the wrapper can wrap a bale located upon the bale transport table with a sheet material, and a bale depositing position in which a wrapped bale can be deposited on the ground;
   wherein the bale support elements are arranged to be moved, in the bale depositing position, into an orientation in which the bale is deposited on a flat end.

2. A baler and wrapper combination according to claim 1, wherein the combination comprises a frame supported on wheels, the baler and the bale wrapper mounted to the frame.

3. A baler and wrapper combination according to claim 2, wherein the bale transport table is mounted to the frame by an extendable arm that extends and retracts in a fore-aft direction.

4. A baler and wrapper combination according to claim 3, wherein the extendable arm is telescoping.

5. A baler and wrapper combination according to claim 3, wherein only a single extendable arm is provided.

6. A baler and wrapper combination according to claim 3, wherein the extendable arm is located one of: on one side or at the longitudinal center plane of the frame.

7. A baler and wrapper combination according to claim 3, wherein the bale transport table is further supported on a bale transport table support element extending in the fore-aft direction, the bale transport table support element spaced from the extendable arm in the transverse direction.

8. A baler and wrapper combination according to claim 7, wherein the bale transport table is supported by a wheel rolling along the bale transport table support element.

9. A baler and wrapper combination according to claim 7, wherein the bale transport table support element comprises a forward part fixed to the frame and a rear part that is pivotable into an inoperative position around a bale transport table support element pivot axis when the extendable arm is retracted and thus the bale transport table is in the bale receiving position.

10. A baler and wrapper combination according to claim 9, wherein the bale transport table support element pivot axis extends horizontally and transversely to the fore-aft direction.

11. A baler and wrapper combination according to claim 1, wherein the bale support elements are arranged to be moved, in the bale depositing position, into an orientation in which the bale is deposited on its circumference.

12. A baler and wrapper combination according to claim 1, wherein the bale support elements are arranged to be driven to rotate around a vertical axis.

13. A baler and wrapper combination according to claim 1, wherein the bale transport table can be pivoted around a horizontal pivot axis into the bale depositing position, the pivot axis extending one of: in the fore-aft direction and transversely thereto and in an intermediate orientation between said orientations and selectable between at least two of both said orientations.

14. A baler and wrapper combination according to claim 1, wherein a vertical axis around which the bale support elements rotate is transversely offset from the longitudinal central plane of the baler and wrapper combination.

15. A baler and wrapper combination according to claim 1, wherein at least one of: the bale transport table and the extendable arm and the bale transport table support element comprise(s) upstanding bale holding elements.

16. A baler and wrapper combination according to claim 1, wherein the sheet material is one of: provided on at least one roll mounted to an arm fixed to the frame and arranged to rotate around a vertical axis, while the bale support elements are rotating around the vertical axis during one of wrapping and standing still.

* * * * *